US012646282B2

(12) United States Patent
Carmona Calpe et al.

(10) Patent No.: US 12,646,282 B2
(45) Date of Patent: Jun. 2, 2026

(54) COLOR ADJUSTMENTS OF HIGHLIGHTED AREAS

(71) Applicant: Hewlett-Packard Development Company, L.P., Spring, TX (US)

(72) Inventors: Carles Carmona Calpe, Sant Cugat del Valles (ES); Jordina Torrents Barrena, Sant Cugat del Valles (ES); Marcos Casaldaliga Albisu, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 627 days.

(21) Appl. No.: 18/153,073

(22) Filed: Jan. 11, 2023

(65) Prior Publication Data

US 2023/0162465 A1 May 25, 2023

Related U.S. Application Data

(63) Continuation of application No. 17/305,120, filed on Jun. 30, 2021, now Pat. No. 11,568,622.

(51) Int. Cl.
| | |
|---|---|
| *G06V 10/22* | (2022.01) |
| *G06F 18/23213* | (2023.01) |
| *H04N 1/60* | (2006.01) |

(52) U.S. Cl.
CPC ........ *G06V 10/22* (2022.01); *G06F 18/23213* (2023.01); *H04N 1/6075* (2013.01)

(58) Field of Classification Search
CPC ..... G06V 10/22; G06K 9/6223; H04N 1/6075
See application file for complete search history.

(56) References Cited

U.S. PATENT DOCUMENTS

| | | | |
|---|---|---|---|
| 10,645,256 B2 | 5/2020 | Miura | |
| 2007/0253620 A1* | 11/2007 | Nagarajan | .......... G06V 30/1444 |
| | | | 382/164 |
| 2019/0279026 A1* | 9/2019 | Sato | ........................ G06N 3/084 |

OTHER PUBLICATIONS

McReynolds, T., et al., "Gamma Correction," Science direct, 2005, pp. 1-54.
Wikipedia, "Cielab color space," retrieved at https://en.wikipedia.org/wiki/CIELAB_color_space, retrieved on Jan. 19, 2023, pp. 11.
Wikipedia, "Gamma correction," retrieved at https://en.wikipedia.org/wiki/Gamma_correction, retrieved on Jun. 27, 2021, pp. 14.
Wikipedia, "HSL and HSV," retrieved at https://en.wikipedia.org/wiki/HSL_and_HSV, retrieved on Jun. 27, 2021, pp. 22.

* cited by examiner

*Primary Examiner* — Christopher Wait
(74) *Attorney, Agent, or Firm* — Jordan IP Law, LLC

(57) ABSTRACT

In some examples, a system detects a highlighted area in an image content. The system applies a color adjustment process in the highlighted area. The color adjustment process is not applied in areas of the image content outside the highlighted area, and the color adjustment process includes an operation of adjusting a color of the highlighted area. The adjusting of the colors of the highlighted area includes adjusting a color value of a specified color space.

12 Claims, 6 Drawing Sheets

| | Thresholds Per Cluster (L*a*b Color Space) |
|---|---|
| Cluster 1 | (118 < a < 131) * (144 < b < 154 ) |
| Cluster 2 | (126 < a < 135) * (133 < b < 143 ) |
| Cluster 3 | (163 < a < 174) * (107 < b < 118 ) |
| Cluster 4 | (97 < a < 107) * (107 < b < 118 ) |
| Cluster 5 | (90 < a < 98) * (153 < b < 161 ) |
| Cluster 6 | (145 < a < 154) * (129 < b < 145 ) |

204

202

300 Highlighter colors clustering process

302 Receive K

304 Receive information of highlighter colors

306 Apply K- means clustering using the information of the highlighter colors to produce K color clusters 308 Generate threshold ranges for the K color clusters 400 ~
Process

402 ~
Receive an input document

404 ~
**Convert image data of the input document to an L\*a\*b image and an HSV image**

420
L\*a\*b Image

422
HSV Image

406 ~
Highlighted areas detection

406-1 ~
Identify areas in the L\*a\*b image containing highlighter colors 406-2 ~
Produce a mask that represents the highlighted areas 406-3 ~
Apply noise filtering to the mask 406-4 ~
Apply image dilation on the noise filtered mask 406-5 ~
Apply hole removal on the noise filtered, dilated mask 424
Output mask 408 ~
Color adjustment

408-1 ~
Build lookup tables to map input color values to respective gamma values 408-2 ~
Apply gamma correction to the S and V components of the HSV image using the lookup tables 426
Lookup table S 428
Lookup table V 430
Enhanced HSV image 410 ~
Convert the enhanced HSV image from the HSV color space to the RGB color space

432
Highlighted areas adjusted output RGB image

700
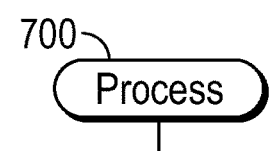

702
Detect a plurality of highlighted areas in an image content, each highlighted area of the plurality of highlighted areas including a respective portion of the image content, and a respective highlighting mark of a respective different color that is superimposed with the respective portion of the image content 704
Apply a color adjustment process in the plurality of highlighted area, where the color adjustment process is not applied in areas of the image content outside the plurality of highlighted areas, and the color adjustment process includes adjusting colors of the plurality of highlighted areas including the portions of the image content superimposed with the highlighting marks, where the adjusting of the colors of the plurality of highlighted areas comprises adjusting color values of plural color components in a specified color space

FIG. 7

COLOR ADJUSTMENTS OF HIGHLIGHTED AREAS

BACKGROUND

A scanner can refer to a device that obtains an image of a physical object using a sensor (or multiple sensors). An example of a scanner is a device into or onto which a document can be fed or placed, where the device has a scanning sensor (or multiple scanning sensors) to acquire an image of the content of the document. As another example, a camera can be used to capture an image of a document.

BRIEF DESCRIPTION OF THE DRAWINGS

Some implementations of the present disclosure are described with respect to the following figures.

FIG. 4 is a flow diagram of a process to adjust colors in highlighted areas, according to some examples.

FIG. 7 is a flow diagram of a process according to further examples.

Figure 1:
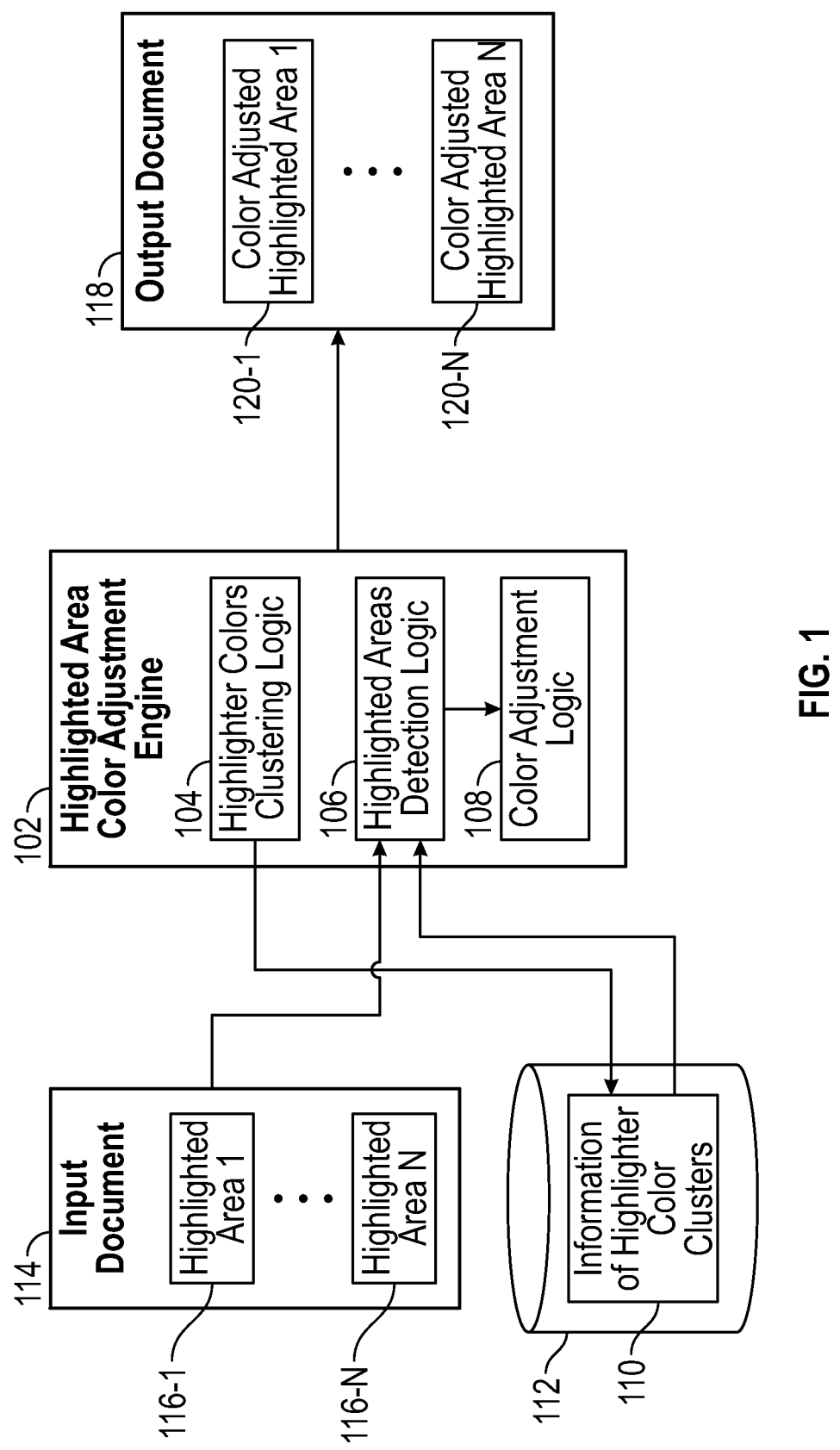
FIG. 1 is a block diagram of an arrangement that includes a highlighted area color adjustment engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Users may use highlighter pens to physically place highlighting marks on documents. The highlighting marks are used to identify regions of interest to the user. As used here, a "highlighting mark" can refer to any visual indicator added to focus on a respective image content portion of a document. An "image content portion" can include text and/or graphics.

A "document" can refer to a physical substrate (e.g., paper, transparency foil, etc.) on which image content has been printed or an electronic representation that includes image content.

Highlighting marks can be according to various different colors, such as fluorescent colors or other colors. In some cases, a user may highlight different parts of a document by using highlighter pens of respective different colors.

In further examples, instead of using physical highlighter pens to highlight image content portions on a physical document, a user may use a computer or another electronic device to perform highlighting of image content portions of a document (that is in electronic form) while viewing a displayed version of the document. The user can then print the highlighted document using a printer, followed by scanning an image of the highlighted document using a scanner.

When a highlighted document is scanned, a degradation of the color of a highlighting mark and/or an image content portion highlighted by the highlighting mark may result. In some cases, a scanned version of the documents can produce a scanned image in which the highlighting mark is barely visible or has a muted color.

In some examples, a scanner may employ image processing programs of a scanner library (which may be loaded in the scanner) to apply image processing on scanned images in attempts to improve the general quality of the scanned images, for example, reducing noise, sharpening lines and text, and so forth. However, in some cases, image processing programs of a scanner library may further degrade specific areas of image content that contain highlighting marks. The degradation of such areas may result in highlighting marks becoming less visible or less apparent, and/or the image quality of image content portions highlighted by the highlighting marks being reduced.

In accordance with some implementations of the present disclosure, techniques or mechanisms are employed to detect a highlighted area in an image content of a document, where the highlighted area includes a portion of the image content, and a highlighting mark that highlights (e.g., using a vivid highlighter color) the portion of the image content (e.g., the highlighting mark has a color that can be very different from a color of the highlighted image content portion). In some examples, the highlighting mark that highlights the portion of the image content is superimposed with (overlays or underlays) the portion of the image content. Note that the highlighting mark (e.g., a highlighting band or other visual artifact of any of various shapes) can be drawn over an image content portion that is already present in a document. In this case, the highlighting mark overlays the image content portion. Alternatively, the highlighting mark may be drawn first in the document, followed by the image content portion being placed in the region of the highlighting mark. In this latter case, the highlighting mark underlays the image content portion.

A highlighting mark can be larger than or smaller than an image content portion that is highlighted by the highlighting mark.

In some examples of the present disclosure, a color adjustment process can be applied in the highlighted area. The color adjustment process is not applied in another area of the image content; in other words, the color adjustment process may be restricted to just highlighted area(s) of a document. The color adjustment process adjusts the color of an image content portion highlighted by the highlighting mark. This color adjustment process can boost the image quality of the highlighted area that includes the image content portion superimposed with the highlighting mark. The color of the highlighting mark is enhanced to improve the visibility of the highlighting mark, which effectively enhances the image quality of the overall highlighted area that includes the highlighting mark and the image content portion superimposed with the highlighting mark.

In further examples, the detection of the highlighted area can be based on clustering of highlighting colors to identify highlighter color clusters.

FIG. 1 is a block diagram of an arrangement that includes a highlighted area color adjustment engine 102 according to some examples. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The highlighted area color adjustment engine 102 can be implemented using a computer or a collection of computers.

In some examples, the highlighted area color adjustment engine 102 includes a highlighter colors clustering logic 104, a highlighted areas detection logic 106, and a color adjustment logic 108. A "logic" of the highlighted area color adjustment engine 102 can refer to a portion of the hardware processing circuit of the highlighted area color adjustment engine 102, or to machine-readable instructions executable by the highlighted area color adjustment engine 102.

Although FIG. 1 shows an example where the various logic 104, 106, and 108 are part of the highlighted area color adjustment engine 102, it is noted that the various logic 104, 106, and 108 may be part of separate engines, which may be implemented using respective different computers, possibly at the same geographic location or at different geographic locations and/or owned by different entities or the same entity.

The highlighter colors clustering logic 104 applies preprocessing to identify multiple highlighter color clusters of various different highlighter colors that can be used for highlighting image content portions of documents. Examples of highlighter colors can include green, yellow, blue, magenta, orange, and various different shades of the foregoing, along with other colors.

Based on the clustering, the highlighter colors clustering logic 104 generates information 110 of the highlighter color clusters, which can be stored in a data repository 112. The data repository 112 can be implemented using a storage device or a collection of storage devices. A storage device can include any or some combination of the following: a disk-based storage device, a solid-state storage device, a memory device, and so forth. An example of the information 110 of the highlighter color clusters is depicted in FIG. 2A (discussed further below).

The information 110 of the highlighter color clusters is provided as an input to the highlighted areas detection logic 106. Another input to the highlighted areas detection logic 106 is an input document 114, which has a number of highlighted areas 116-1 to 116-N. Although N is assumed to be 2 in examples discussed herein, it is noted that in other examples, the input document 114 can include just one highlighted area. The highlighted areas detection logic 106 is able to detect the highlighted areas 116-1 to 116-N based on the information 110 of the highlighter color clusters.

Figures 1A, 2A:
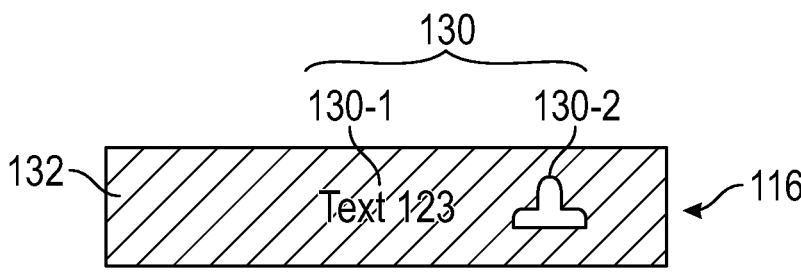
FIG. 1A illustrates an example of a highlighted area detectable according to some examples.
FIGS. 2A and 2B illustrate an example relating to clustering of highlighter colors, according to some examples.

An example of a highlighted area 116 is shown in FIG. 1A. The highlighted area includes an image content portion 130 that has text 130-1 and a graphical element 130-2. The image content portion 130 is highlighted by a highlighting mark 132, which in the example of FIG. 1A has a generally rectangular profile that overlays the image content portion 130. In other examples, the highlighting mark 132 can have a different shape, depending upon how a user draws the highlighting mark 132.

Information of the detected highlighted areas 116-1 to 116-N is provided by the highlighted areas detection logic 106 to the color adjustment logic 108. The color adjustment logic 108 can perform an adjustment of colors of the highlighted areas 116-1 to 116-N. For example, the color adjustment logic 108 can adjust colors of highlighting marks in the highlighted areas 116-1 to 116-N.

The color adjustment performed by the color adjustment logic 108 in the highlighted areas 116-1 to 116-N can be referred to as "highlighted area color adjustment." In some examples, the highlighted area color adjustment adjusts color values of multiple color components in an HSV (Hue, Saturation, Value) color space.

The HSV color space describes colors in terms of hue (dominant wavelength or point in color wheel), saturation (which corresponds to an amount of gray) and a brightness value. In such examples, the HSV color space can also be referred to as an HSB color space, in which Brightness (B) is substituted for Value (V).

In examples according to the present disclosure, an HSV color space can also refer to an HSL (Hue, Saturation, Lightness) color space. In the HSL color space, the V component is replaced with the L component.

In the HSV color space, the highlighted area color adjustment can adjust the S and V components (the saturation component and the brightness or lightness component). The highlighted area color adjustment applied to the S and V components can include a gamma correction or a different type of color adjustment (discussed further below).

More generally, the highlighted area color adjustment applied by the color adjustment logic in a highlighted area includes an adjustment of color values of multiple color components of a specified color space, such as the HSV color space or another color space.

After adjusting the colors of highlighting marks in the highlighted areas 116-1 to 116-N, the image quality of the combination of the highlighting marks and the respective superimposed image content portions is improved. Performing the highlighted area color adjustment of multiple color components of the specified color space can produce better results in terms of the image quality of the respective color adjusted highlighted area, since the color adjustment considers more than one color component of a color space. For example, by applying a gamma correction with different parameters for each of the S and V color components of the HSV color space (discussed further below), a more vivid color can be obtained in the highlighted area than would be possible based on applying the same gamma transformation to S and V components or applying a color transformation to a grayscale conversion of an image.

Based on the color adjustment performed by the color adjustment logic 108, the highlighted area color adjustment engine 102 produces an output document 18 that includes color adjusted highlighted areas 120-1 to 120-N, which correspond to the highlighted areas 116-1 to 116-N of the input document 114. In other words, the color adjusted highlighted area 120-1 is based on a color adjustment (performed by the color adjustment logic 108) of the highlighted area 116-1, the color adjusted highlighted area 120-N is based on a color adjustment (performed by the color adjustment logic 108) of the highlighted area 116-N, and so forth.

For improved efficiency, the color adjustment logic 108 restricts the application of the highlighted area color adjustment to the highlighted areas 116-1 to 116-N, without applying the highlighted area color adjustment in other areas of the input document 114 that are outside of the highlighted areas 116-1 to 116-N. By skipping the highlighted area color adjustment in the other areas, less burden is placed on physical resources (e.g., processing resources, storage resources, communication resources, etc.) of a computer (or computers).

It is noted that the highlighter colors clustering performed by the highlighter colors clustering logic 104 can be performed once. Once the highlighter clustering is performed, the highlighted areas detection logic 106 can use the information 110 of the highlighter color clusters to perform highlighted areas detection for multiple input documents.

In some cases, the highlighter colors clustering may be re-iterated if new highlighter colors are added, or if highlighter colors are changed or deleted.

In some examples, the clustering applied by the highlighter colors clustering logic 104 is a K-means clustering that produces K (K≥2) highlighter color clusters. In other examples, other clustering techniques can be applied to cluster the highlighter colors.

Figures 2B, 3:
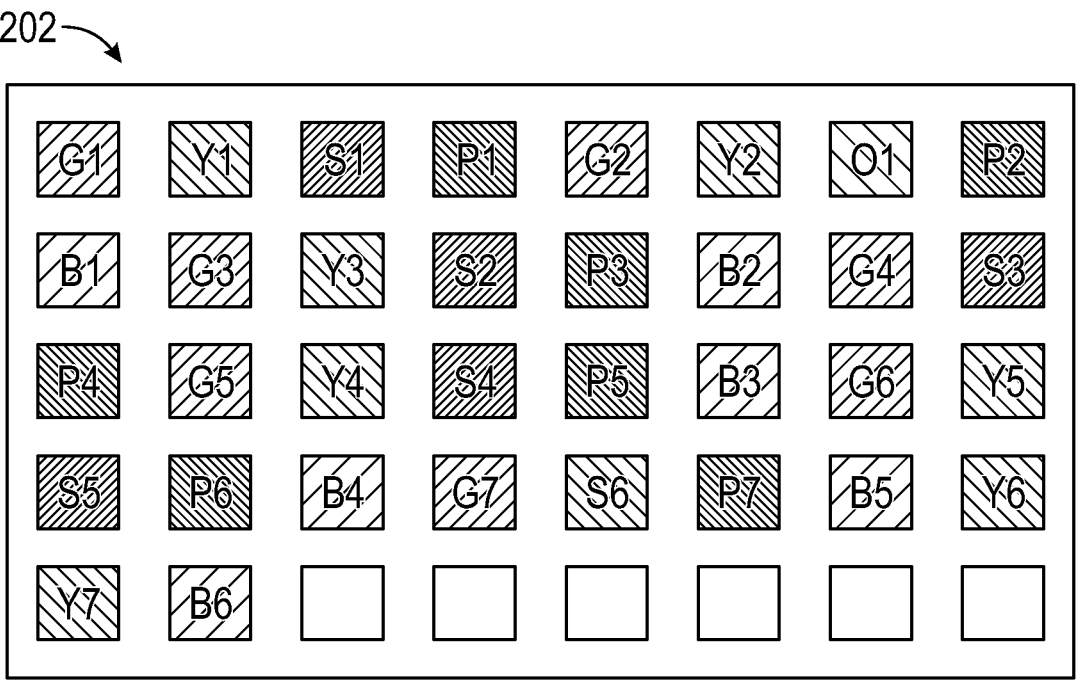
FIG. 3 is a flow diagram of a highlighter colors clustering process, according to some examples.

Referring to FIGS. 2A-2B and 3, an example highlighter colors clustering process 300 as performed by the highlighter colors clustering logic 104 is shown. Note that in other examples, the highlighter colors clustering process 300 may include a different order of tasks, and may include additional or alternative tasks.

The highlighter colors clustering process 300 receives (at 302) a value of K, which specifies a quantity of clusters to be produced by the K-means clustering to be applied on the highlighter colors.

The highlighter colors clustering process 300 receives (at 304) information of highlighter colors. The information of highlighter colors can be in the form of a representation 202 of possible highlighter colors, as shown in FIG. 2B.

FIG. 2B shows various different shades of highlighter colors, such as different shades of green expressed as G1, G2, G3, G4, G5, G6, and G7, different shades of yellow expressed as Y1, Y2, Y3, Y4, Y5, Y6, and Y7, different shades of salmon expressed as S1, S2, S3, S4, S5, and S6, different shades of pink expressed as P1, P2, P3, P4, P5, P6, and P7, different shades of blue expressed as B1, B2, B3, B4, B5, and B6, and a shade of orange expressed as O1.

The representation 202 of possible highlighter colors can include color values of the highlighter colors, such as those in the color patches shown in FIG. 2B. The color values of the highlighter colors can be in the CIELAB color space, also referred to as the L*a*b* color space defined by the International Commission on Illumination (CIE). In other examples, the information of the highlighter colors can be in a different color space, such as the CIEXYZ color space, a CMYK (Cyan Magenta Yellow Black) color space, an RGB (Red Green Blue) color space, and so forth.

CIELAB is a device-independent color space, and expresses color as three values: L for perceptual lightness, and a and b for the four unique colors of human vision: red, green, blue, and yellow. CIEXYZ is also a device-independent color space, and expresses tristimulus values represented by X, Y, and Z.

Assuming the L*a*b* color space is employed, the information of the highlighter colors can represent the different colors using different combinations of L, a, b color values.

The highlighter colors clustering process 300 applies (at 306) K-means clustering using the information of the highlighter colors, to produce K color clusters. In some examples, the K-means clustering is based on the L, a, b values of the respective highlighter colors. K-means clustering partitions observations that are in the form of multidimensional vectors. For a highlighter color, a multi-dimensional vector that includes the L, a, b values of the highlighter color. The observations are partitioned into K sets of observations (K clusters).

Each set of observations has a cluster centroid that represents the respective cluster. The cluster centroid is calculated as an arithmetic mean of the observations of the respective cluster, or more specifically for highlighter colors, a cluster centroid has L, a, b values that is an arithmetic mean of the L, a, b values of the observations that are part of the respective highlighter color cluster.

Assuming K is set to 6, then 6 highlighter color clusters 204 are identified, as shown in in FIG. 2A. For example, a first highlighter color cluster can include the G1, G2, G3, G4, G5, G6, and G7 colors, a second highlighter color cluster can include the Y1, Y2, Y3, Y4, Y5, Y6, and Y7 colors, a third highlighter color cluster can include the S1, S2, S3, S4, S5, and S6 colors, a fourth highlighter color cluster can include the P1, P2, P3, P4, P5, P6, and P7 colors, a fifth highlighter color cluster can include the B1, B2, B3, B4, B5, and B6 colors, and a sixth highlighter color cluster can include the O1 color.

Each highlighter color cluster is associated with threshold ranges of a and b values. For example, for cluster 1, the threshold range for a values is between 118 and 131, and the threshold range for b values is between 144 and 154. A threshold range of values is based on the observations included in each highlighter color cluster. For example, if a given highlighter color cluster includes M observations (including respective L, a, b values for respective M highlighter colors), then the threshold range for a values and the threshold range for b values is based on the L, a, b values of the M observations in the given highlighter color cluster.

The threshold ranges of a and b values for the corresponding different highlighter color clusters are used for determining (by the highlighted areas detection logic 106) whether highlighting marks according to respective highlighter colors are present in an input document.

Figure 4:
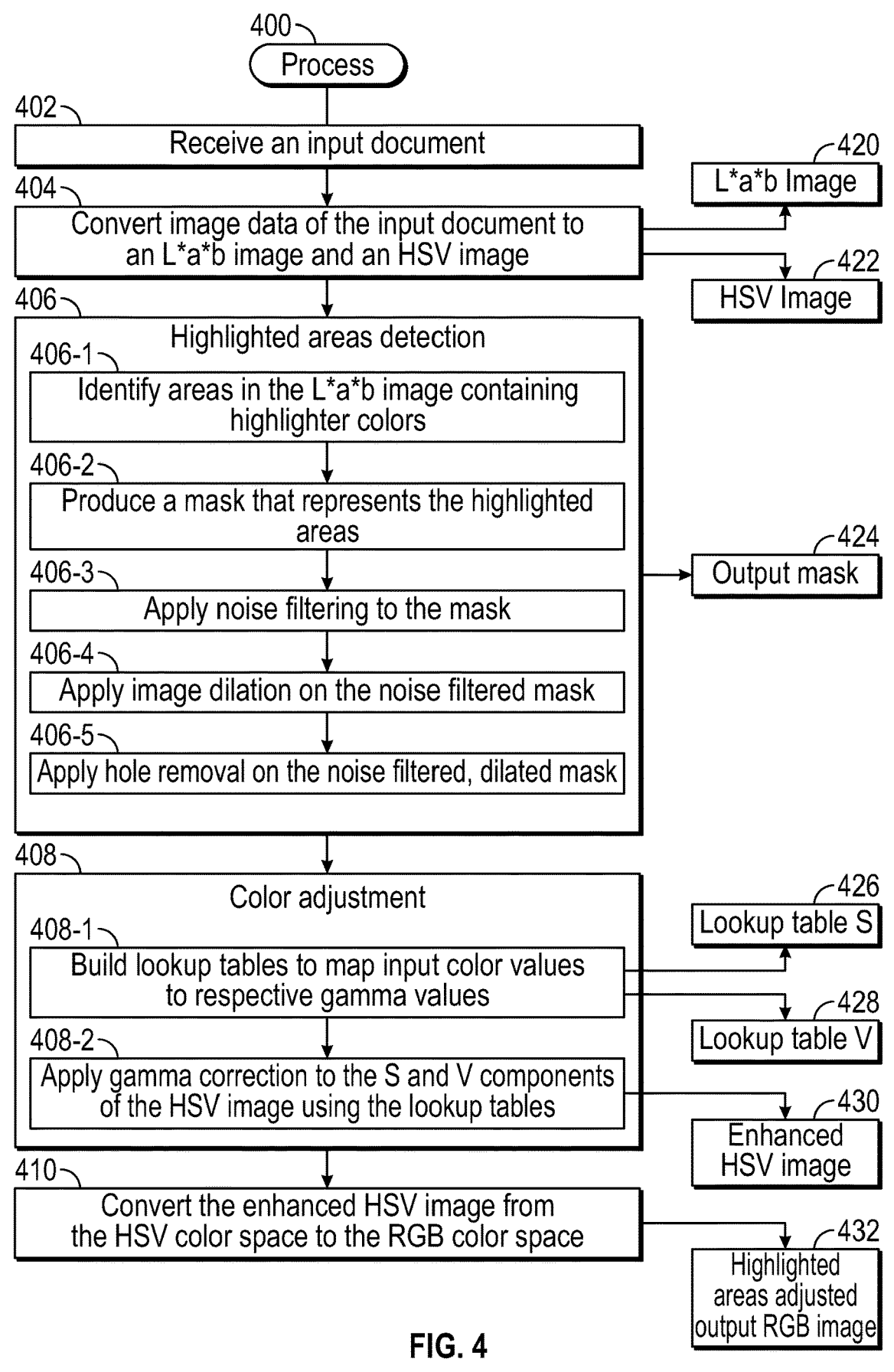

FIG. 4 is a flow diagram of a process 400 performed by the highlighted areas detection logic 106 and the color adjustment logic 108 according to some examples. It is assumed that the process 400 is performed after the highlighter colors clustering process 300 of FIG. 3 has been completed to identify the highlighter color clusters.

The process 400 receives (at 402) an input document containing highlighted areas, such as the input document 114 in FIG. 1. In some examples, it is assumed that image data of the input document is in the RGB color space. In other examples, the image data of the input document can be in a different color space.

The process 400 converts (at 404) the image data of the input document from the RGB color space to each of the L*a*b color space and the HSV color space, to produce a corresponding L*a*b image 420 and a corresponding HSV image 422. Although reference is made to processing performed in the L*a*b and HSV color spaces, it is noted that other examples can perform processing in different color spaces.

The highlighted areas detection logic 106 applies highlighted areas detection (406) in the L*a*b image 420 to detect highlighted areas in the image data of the input document.

The highlighted areas detection (406) identifies (at 406-1) areas in the L*a*b image 420 containing highlighter colors that fall within any of the K highlighter color clusters, based on comparing colors in the L*a*b image 420 to the threshold ranges for the a and b values of the highlighter clusters (e.g., as shown in FIG. 2A).

The identification (at 406-1) searches for a collection of pixels that have colors that fall within any of the K highlighter color clusters. For example, a collection of pixels is identified as being a highlighted area if the colors of the pixels in the collection of pixels have a and b values that fall within threshold ranges of the a and b values for a given highlighter color cluster. In some examples, for a collection of pixels to be identified as being a highlighted area, the collection of pixels has a size (e.g., a length and/or a width, a diameter, etc.) that exceeds a specified size threshold. A collection of pixels having a size less than the specified size threshold is not identified as a highlighted area.

The highlighted areas detection (406) produces (at 406-2) a mask that represents the identified highlighted areas. In some examples, the mask can have coordinates (e.g., X and Y coordinates in the X-Y geometric space) that fall within the dimensions (width and length in the X and Y axes) of the L*a*b image 420. In some examples, the mask is a binary mask that includes 0s and 1s at respective locations of the L*a*b image 420, where 0 indicates a location of the L*a*b image 420 that is not part of a highlighted area, and 1 represents a location of the L*a*b image 420 that is in a highlighted area. A "location" assigned a 0 or 1 can refer to a pixel or a group of pixels in the L*a*b image 420.

In other examples, a different type of mask (with more than two binary values) or any other representation of indicators of highlighted areas can be used.

The highlighted areas detection (406) can apply noise filtering (at 406-3) to reduce noise in the mask. For example, a median filter or another type of noise filter can be applied to the mask. A median filter is a non-linear digital filter that removes noise from an image or signal. In other examples, other types of noise filtering can be applied. Noise filtering is applied to smooth out boundaries of the identified highlighted areas. A noisy image on which the highlighted areas detection (406) is applied can cause irregular boundaries (e.g., jagged edges, etc.).

The highlighted areas detection (406) also applies image dilation (at 406-4) on the noise filtered mask, in which a dilation operator is applied to the mask to expand sizes of the highlighted areas. The noise filtering applied may cause an erosion in the boundaries of the highlighted areas represented in the mask. The image dilation causes the boundaries of the highlighted areas represented in the mask to increase in size.

Further, the highlighted areas detection (406) can apply hole removal (at 406-5) to remove holes that may be present in the highlighted areas represented in the noise filtered, dilated mask. For example, within an area of neighboring locations in the mask, there may be a hole or multiple holes in the form of a 0 or multiple 0s in a collection of 1s. When such holes are detected, these locations that are initially assigned 0s in the mask are changed to 1s.

After the application of the noise filtering, mask dilation, and hole removal, the highlighted areas detection logic 106 produces an output mask 424 with indicators (e.g., collections of 1s) that represent respective highlighted areas.

In the process 400, the color adjustment logic 108 applies, based on the output mask, a color adjustment (408) on the HSV image 422 in the HSV color space. The color adjustment (408) that is applied can include gamma correction. The output mask is used by the color adjustment logic 108 to determine where in the HSV image the highlighted areas are located. The HSV image can have the same geometric coordinates in the X-Y geometric space as the L*a*b image, so that the output mask would employ the same geometric coordinates as the HSV image. The color adjustment (408)

is applied in those highlighted areas of the HSV image indicated by the output mask, and not in other areas of the HSV image.

A gamma correction is a nonlinear operation that transforms input color values (such as color values of the S and V components of the HSV color space). In some examples, the gamma correction is expressed using the following power-law expression:

$$R = AI^{\gamma}, \tag{Eq. 1}$$

where I is an input value (e.g., a color value such as a color value of an S or V component), R is an output value, A is a predefined constant (e.g., 1 or another value), and $\gamma$ is a power value that can be empirically set based on historical observed data relating to highlighter colors and how scanning of such highlighter colors affects their appearance. Different values of $\gamma$ can be used for different types of scanners and/or contexts.

In some example, the power value $\gamma$ used for gamma correction of the color values of the S component is 2.2, while the power value $\gamma$ used for gamma correction of the color values of the V component is 1.2. In other examples, other power values, $\gamma$, can be employed.

As part of the gamma correction, the color adjustment (408) builds (at 408-1) lookup tables to map input color values of the HSV image to their respective gamma values (as computed according to Eq. 1). A first lookup table 426 can be used to map input color values of the S component of the HSV color space to respective gamma values, and a second lookup table 428 can be used to map input color values of the V component of the HSV color space to respective gamma values.

Assuming 8-bit gamma correction is employed, the input color values (I) are 8 bits in length, which means that the input color value (I) of the S component or V component of the HSV image 422 can range between 0 and 255. In other examples, input color values can be of other lengths.

The color adjustment (408) applies gamma correction (at 408-2) to the S and V components of the HSV image 422 using the lookup tables 426 and 428. For each pixel of the HSV image 422, the gamma correction (408-2) uses the S value of the pixel to retrieve a corresponding S-component gamma value from the first lookup table 426, and uses the V value of the pixel to retrieve a corresponding V-component gamma value from the second lookup table 428.

The color adjustment (408) produces an enhanced HSV image 430 based on the gamma correction, in which the colors in the highlighted areas of the input document are color adjusted to use the S-component gamma values and the V-component gamma values instead of the input S-component and V-component values of the input document.

In other examples, instead of or in addition to applying gamma correction, the color of the pixels mapped to the different highlighter colors can be changed to a designated target color for each highlighter color cluster. For example, assume there are 6 highlighter color clusters. Six designated different highlighter colors can be assigned to the 6 highlighter color clusters. The color adjustment (408) can replace highlighter colors in the highlighted areas of the HSV image 422 with respective colors of the 6 designated different highlighter colors.

The process 400 converts (at 410) the enhanced HSV image 430 from the HSV color space to the RGB color space, to produce a highlighted areas adjusted output RGB image 432 that includes color adjusted highlighted areas, such as those in the output document 118 of FIG. 1.

Figure 5:
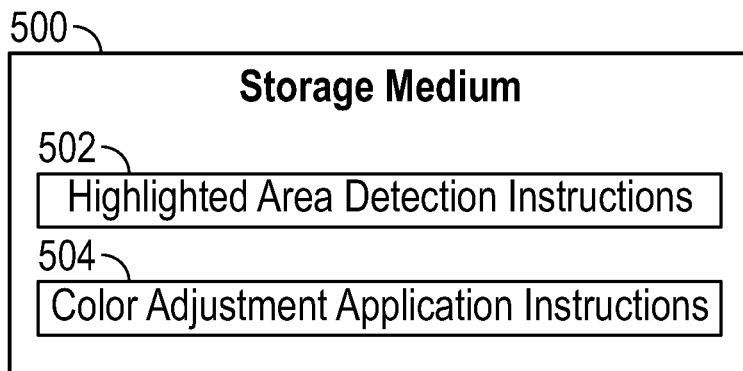
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system (a computer or multiple computers) to perform various tasks.

The machine-readable instructions include highlighted area detection instructions 502 to detect a highlighted area in an image content, the highlighted area including a portion of the image content, and a highlighting mark that highlights the portion of the image content.

The machine-readable instructions include color adjustment application instructions 504 to apply a color adjustment process in the highlighted area, where the color adjustment process includes adjusting a color of the highlighted area including the portion of the image content highlighted by the highlighting mark, and where the adjusting of the color of the highlighted area includes adjusting color values of plural color components in a first color space (e.g., an HSV color space).

In some examples, the color adjustment process is not applied in another area of the image content outside of the highlighted area.

In some examples, highlighter colors are clustered to identify highlighter color clusters. The detecting of the highlighted area is based on the highlighter color clusters.

In some examples, the clustering of the highlighter colors is based on clustering values of color components of a second color space (e.g., a and b components the L*a*b color space).

In some examples, the detecting of the highlighted area includes identifying a collection of neighboring pixels that have color values satisfying a threshold, e.g., within a range of thresholds of a given color component.

In some examples, detecting of the highlighted area includes detecting a subset of pixels within the collection of neighboring pixels where the subset of pixels does not satisfy the threshold, and add the subset of pixels to the collection of neighboring pixels that forms the highlighted area. This processing relates to the hole removal discussed further above.

Figure 6:
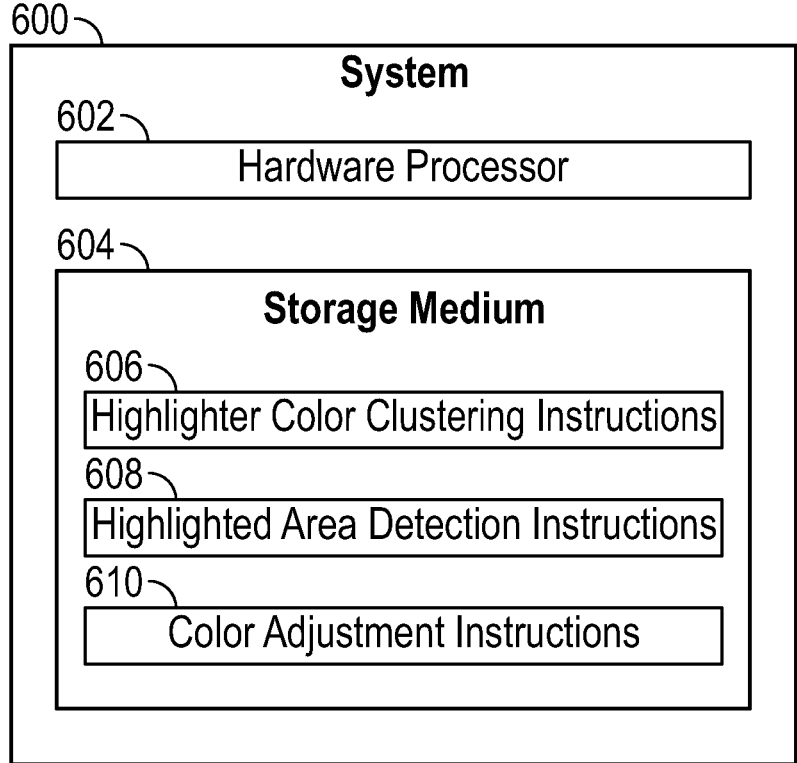
FIG. 6 is a block diagram of a system according to some examples.

FIG. 6 is a block diagram of a system 600 according to some examples. The system 600 includes a computer or a number of computers.

The system 600 includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The system 600 includes a storage medium 604 storing machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include highlighter color clustering instructions 606 to cluster highlighter colors to identify highlighter color clusters.

The machine-readable instructions in the storage medium 604 include highlighted area detection instructions 608 to detect a highlighted area in an image content based on the highlighter color clusters, the highlighted area including a portion of the image content, and a highlighting mark according to a highlighter color that highlights the portion of the image content.

The machine-readable instructions in the storage medium 604 include color adjustment instructions 610 to apply a color adjustment process in the highlighted area wherein a color of the highlighting mark is adjusted.

FIG. 7 is a flow diagram of a process 700 according to some examples, which can be performed by the highlighted color adjustment engine 102 of FIG. 1, for example.

The process 700 includes detecting (at 702) a plurality of highlighted areas in an image content, each highlighted area of the plurality of highlighted areas including a respective portion of the image content, and a respective highlighting mark of a respective different color that is superimposed with the respective portion of the image content.

The process 700 includes applying (at 704) a color adjustment process in the plurality of highlighted area, where the color adjustment process is not applied in areas of the image content outside the plurality of highlighted areas, and the color adjustment process includes adjusting colors of the plurality of highlighted areas including the portions of the image content superimposed with the highlighting marks, where the adjusting of the colors of the plurality of highlighted areas comprises adjusting color values of plural color components in a specified color space.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

detect a highlighted area in an image content;
  apply a color adjustment process in the highlighted area; and
  cluster highlighter colors to identify highlighter color clusters,
  wherein the detecting of the highlighted area is based on the highlighter color clusters.

2. The non-transitory machine-readable storage medium of claim 1, wherein the color adjustment process is not applied in another area of the image content outside of the highlighted area.

3. The non-transitory machine-readable storage medium of claim 1, wherein the clustering of the highlighter colors is based on clustering values of color components of a second color space different from a first color space used to apply the color adjustment process in the highlighted area.

4. The non-transitory machine-readable storage medium of claim 3, wherein the clustering of the highlighter colors based on the values of the color components of the second color space comprises clustering values of a and b components of an L*a*b color space.

5. The non-transitory machine-readable storage medium of claim 3, wherein the highlighter color clusters are associated with different ranges of the values of the color components of the second color space.

6. The non-transitory machine-readable storage medium of claim 1, wherein the detecting of the highlighted area comprises identifying a collection of neighboring pixels that have color values satisfying a threshold.

7. The non-transitory machine-readable storage medium of claim 6, wherein the detecting of the highlighted area comprises:

detecting a subset of pixels within the collection of neighboring pixels wherein the subset of pixels does not satisfy the threshold, and adding the subset of pixels to the collection of neighboring pixels that forms the highlighted area.

8. The non-transitory machine-readable storage medium of claim 1, wherein the instructions upon execution cause the system to:

detect further highlighted areas in the image content; and apply another color adjustment process in the further highlighted areas, wherein the highlighted area and the further highlighted area are of different colors.

9. The non-transitory machine-readable storage medium of claim 3, wherein the applying of the color adjustment process comprises applying gamma correction to color values of pixels of the highlighted area.

10. The non-transitory machine-readable storage medium of claim 9, wherein the first color space comprises a Hue, Saturation, Value (HSV) color space, and wherein the instructions upon execution cause the system to:

build a first lookup table to map values of the saturation components of the HSV color space to saturation gamma values; and build a second lookup table to map values of the value components of the HSV color space to value gamma values, wherein the applying of the gamma correction to the color values of the pixels of the highlighted areas uses the first lookup table and the second lookup table.

11. A system comprising:

a processor; and a non-transitory storage medium storing instructions executable on the processor to:

cluster highlighter colors to identify highlighter color clusters;

detect a highlighted area in an image content based on the highlighter color clusters; and apply a color adjustment process in the highlighted area.

12. The system of claim 11, wherein the clustering of the highlighter colors is based on clustering values of color components of a specified color space.

* * * * *